(12) United States Patent
Eickhorst et al.

(10) Patent No.: US 11,292,130 B2
(45) Date of Patent: Apr. 5, 2022

(54) METHOD FOR MOTION SIMULATION OF A MANIPULATOR

(71) Applicant: Broetje-Automation GmbH, Rastede (DE)

(72) Inventors: Dirk Eickhorst, Varel (DE); Marcel Meyer, Bad Zwischenahn (DE)

(73) Assignee: Broetje-Automation GmbH, Rastede (DE)

( * ) Notice: Subject to any disclaimer, the term of this patent is extended or adjusted under 35 U.S.C. 154(b) by 835 days.

(21) Appl. No.: 15/532,825

(22) PCT Filed: Dec. 3, 2015

(86) PCT No.: PCT/EP2015/078533
§ 371 (c)(1),
(2) Date: Oct. 11, 2017

(87) PCT Pub. No.: WO2016/087590
PCT Pub. Date: Jun. 9, 2016

(65) Prior Publication Data
US 2018/0126554 A1 May 10, 2018

(30) Foreign Application Priority Data
Dec. 5, 2014 (DE) .................... 10 2014 118 001.1

(51) Int. Cl.
*B25J 9/16* (2006.01)

(52) U.S. Cl.
CPC .......... *B25J 9/1666* (2013.01); *B25J 9/1671* (2013.01); *B25J 9/1676* (2013.01); *B25J 9/1694* (2013.01);
(Continued)

(58) Field of Classification Search
CPC ...... B25J 9/1666; B25J 9/1671; B25J 9/1676; B25J 9/1694; B25J 9/16; B25J 9/1664;
(Continued)

(56) References Cited

U.S. PATENT DOCUMENTS

| 9,547,301 B2 | 1/2017 | Seya et al. | |
| 2007/0013336 A1* | 1/2007 | Nowlin | A61B 90/37 318/568.21 |

(Continued)

FOREIGN PATENT DOCUMENTS

| CN | 101122791 | 2/2008 |
| DE | 102006005344 | 8/2007 |

(Continued)

OTHER PUBLICATIONS

"German Search Report," for Priority Application No. DE102014118001.1 dated Jul. 28, 2015 (7 pages).
(Continued)

*Primary Examiner* — Robert T Nguyen
(74) *Attorney, Agent, or Firm* — Pauly, DeVries Smith & Deffner LLC (57) ABSTRACT

Various embodiments relate to a method for motion simulation for a manipulator, such as an NC-controlled manipulator, in a machining environment, wherein the manipulator is moved in an operating mode by a control apparatus and the machining environment is at least partly mapped in an environment model and wherein the method comprises computation of a trajectory plan by the control apparatus from a setpoint movement of the manipulator starting from an initial situation and based on a kinematic model of the manipulator, performance of a kinematic collision check based on the trajectory plan, the kinematic model and the environment model, and production of a prediction result based on the kinematic collision check. The method is
(Continued)

characterized in that the initial situation corresponds to the current manipulator state. Further, some embodiments relate to a corresponding computer program with program code and to a corresponding system for motion simulation for a manipulator.

19 Claims, 4 Drawing Sheets

(52) U.S. Cl.
CPC .............. *G05B 2219/35308* (2013.01); *G05B 2219/40311* (2013.01)

(58) Field of Classification Search
CPC ........... G05B 2219/35308; G05B 2219/40311; G05B 2219/40317
See application file for complete search history.

(56) References Cited

U.S. PATENT DOCUMENTS

| | | | | |
|---|---|---|---|---|
| 2009/0299509 | A1* | 12/2009 | Diezel | G05B 19/4069 700/97 |
| 2010/0331855 | A1* | 12/2010 | Zhao | A61B 34/30 606/130 |
| 2012/0029700 | A1* | 2/2012 | Eickhorst | B25J 9/1676 700/264 |
| 2012/0215354 | A1* | 8/2012 | Krasny | B25J 9/1666 700/255 |
| 2013/0116828 | A1* | 5/2013 | Krause | B25J 9/1605 700/264 |
| 2014/0276953 | A1* | 9/2014 | Swarup | B25J 18/007 606/130 |
| 2014/0276954 | A1* | 9/2014 | Hourtash | B25J 9/1666 606/130 |
| 2014/0316430 | A1* | 10/2014 | Hourtash | B25J 9/1689 606/130 |
| 2014/0316431 | A1* | 10/2014 | Hourtash | A61B 34/30 606/130 |
| 2017/0095301 | A1* | 4/2017 | Brisson | B25J 9/1689 |
| 2021/0220994 | A1* | 7/2021 | Colasanto | G06N 3/126 |

FOREIGN PATENT DOCUMENTS

| | | |
|---|---|---|
| DE | 102008027475 | 12/2009 |
| DE | 102009007932 | 8/2010 |
| DE | 102010032917 | 4/2012 |
| DE | 102011014299 | 9/2012 |
| EP | 1152212 | 11/2001 |
| EP | 2418555 | 2/2012 |
| WO | 03059582 | 7/2003 |
| WO | 2007036466 | 4/2007 |
| WO | 2010017835 | 2/2010 |
| WO | 2017028628 | 2/2017 |

OTHER PUBLICATIONS

"International Search Report and Written Opinion," for Corresponding PCT Application No. PCT/EP2015/078533 dated Apr. 18, 2016 (14 pages).

"Sinamics S120," product specification sheet. Siemens Industry, Inc. 2014, URL <http://www.empautomation.com/Portals/Distribution/Files/CatalogSIEMENS%20S120%20Servo%20overview2%20080414.pdf?ver=2017-07-07-143358-783> accessed Jul. 13, 2017 (24 pages).

"Sinumerik 840D sl," specification sheet. Siemens Industry, Inc. 2014 URL <http://www.industry.usa.siemens.com/drives/us/en/cnc/systems-and-products/Documents/Brochure-SINUMERIK-840D-sl.pdf> accessed Jul. 13, 2017 (28 pages).

"Sinumerik OP 019," product specification sheet, Siemens Industry, Inc. 2011 URL <http://www.crackthegcode.com/pdfs/sinumerik_op_19.pdf> accessed Jul. 13, 2017 (2 pages).

Chinese Search Report for Chinese Patent Application No. 201580075538.1 dated Aug. 23, 2019 (3 pages).

* cited by examiner

METHOD FOR MOTION SIMULATION OF A MANIPULATOR

CROSS-REFERENCE TO RELATED APPLICATIONS

This application is a national stage application under 35 U.S.C. 371 of International Patent Application Serial No. PCT/EP2015/078533, entitled "METHOD FOR MOTION SIMULATION OF A MANIPULATOR," filed Dec. 3, 2015, which claims priority from German Patent Application No. DE 10 2014 118 001.1, filed Dec. 5, 2014, the disclosure of which is incorporated herein by reference.

Field of the Technology

The disclosure relates to a method for motion simulation for a manipulator in a machining environment, a computer program with program code and a system for motion simulation for a manipulator in a machining environment.

Background

In robotics, the moving part of a robot structure or of an industrial robot is referred to as the manipulator. Such manipulators are today regularly used in automated production, for example for the manufacture of aircraft structure assemblies. They are multi-axis buckling arm robots, for example, which are used in applicable production cells. The axial attitude of such a manipulator then determines the reference position, including the orientation, for the tool or the end effector of the robot, which reference position is also referred to as the tool centre point.

Machining large workpieces in particular, that is to say, in this case, fuselages, wings and component parts thereof, for example, in production cells using multi-axis industrial robots of this kind requires complex motion sequences for the individual axes of such a robot, which motion sequences can regularly be computed only by complicated algorithms of applicable control apparatuses. A motion sequence determined in this manner is also referred to as a trajectory plan, and a control apparatus of this kind is also referred to as a numerical controller (NC) or as a computer-aided numerical controller (CNC). Thus, the user specifies a desired target position and situation for the manipulator, for example, and the control apparatus takes this as a basis for computing a trajectory plan for the manipulator, along which the manipulator is then moved in order to reach said target position.

Besides avoiding singularities, the trajectory plan must, in order to avoid collisions by the manipulator, also take into consideration obstacle contours in the production cell. Obstacle contours of this kind are formed not only by the workpiece itself but also by other objects in the environment, which include particularly the further component parts of the production cell, such as, for example, structural elements, motors, assembly carriers, personnel platforms, sensors, etc. Since firstly the design data both for the workpiece and for the manipulator and the production cell as a whole and secondly the respective situation of the operating points on the workpiece are regularly known, such a trajectory plan is normally produced in advance in a simulation, which trajectory plan then just needs to be followed during actual operation. Such a simulation, which is separated, in terms of time and in most cases also in terms of space, from the actual machining and movement in the production cell, is regularly referred to as offline simulation and the corresponding programming of the control apparatus is, by analogy, referred to as offline programming Specifically, a method for offline programming, which additionally provides a check for kinematic singularities along the programmed trajectory plan and in a tolerance range in the environment of this trajectory plan, is known from EP 2 418 555 A2.

A disadvantage of this and similar methods for offline programming is that in such a trajectory plan developed "offline" and thus in a manner decoupled from real operation, on the drawing board as it were, it is impossible to rule out the occurrence of an unforeseen situation in which it becomes necessary for the user to take action in a manner that departs from the trajectory plan determined in advance.

The need for such action can arise, by way of example, as a result of a proximity sensor of the manipulator detecting a drop below a minimum distance between the manipulator, particularly its end effector, and the workpiece or another obstacle contour. Particularly when, in such a state, a further movement by the manipulator in accordance with the trajectory plan would then reduce the relevant distance from the obstacle contour still further, the associated collision risk means that the movement of the manipulator in accordance with the trajectory plan is regularly aborted. Such a discrepancy in the measured distance from the distance previously simulated in accordance with the offline programming cannot be ruled out in practice. The discrepancy can arise as a result of thermal effects or other irregularities on the workpiece or on parts of the production cell, for example.

Since it is no longer possible to continue with the original trajectory plan, the user of the control apparatus needs, in such a case, to specify a new target for the manipulator by means of manual control of the manipulator—also referred to as jog mode—or by means of some other manner of input, for which new target it is then necessary to ascertain a corresponding new trajectory plan that is meant to lead to movement of the manipulator out of the present situation at risk of a collision. This movement itself is for its part not meant to result in a collision.

The selection of a suitable direction of movement or of a suitable movement target for the manipulator is frequently linked to considerable difficulties, however. First, it is frequently the case that the user has no view at all or only an inadequate view of the precise location at which the manipulator is currently positioned and at which the critical collision situation prevails from his local workstation—which is predominantly arranged outside the production cell in the strict sense—, which means that at the first instant it is not necessarily clear to him at all which envisaged movement process by which axis of the manipulator presents a risk of collision with which obstacle.

Even when additional cameras are arranged in the production cell, there is by no means the assurance that they can actually provide a useful view of the relevant location. Added to this is the fact that each installed camera per se already forms a further obstacle contour, as a result of which the movement options for the manipulator are limited further in principle. For this reason, it is frequently difficult for the user to tell what might actually constitute a movement by the manipulator that results not in a collision but rather in a new position for the manipulator at a sufficient distance from the obstacle contours.

In practice, attempts are frequently made to resort to the user or another colleague entering the production cell in order to get a better view of the problematic situation of the manipulator. It goes without saying that this is not acceptable from the viewpoint of occupational safety. Added to this is the fact that when attempting to manually remove the manipulator, the risk of a collision as a result of a misjudgement of the geometric circumstances is very high and this regularly results in damage to the manipulator, to the assembly or to the production cell and hence also in longer downtimes for the production cell.

SUMMARY

The problem on which the disclosure is based is thus that of further developing a method known from the prior art for motion simulation for a manipulator in a machining environment such that the rectification of collision risk situations that arise when a trajectory plan is executed by the manipulator is facilitated.

The above problem can be solved with a method for motion simulation for a manipulator in a machining environment in accordance with various embodiments disclosed herein, with a computer program with program code in accordance with various embodiments disclosed herein, and/or with a system for motion simulation for a manipulator in a machining environment in accordance with various embodiments disclosed herein.

The method in accordance with the proposal is used for motion simulation for a manipulator in a machining environment, wherein the manipulator is moved in an operating mode by a control apparatus and wherein the machining environment is mapped in an environment model.

In the present case, the term "manipulator" can be interpreted broadly. Not only does it cover the manipulator in a narrower sense, it also encompasses any end effector arranged on said manipulator and other components that move along during a movement by the manipulator.

A "control apparatus" within the context of the proposal, which in the present case can consist of one or more, possibly distributed single apparatuses, is an apparatus for controlling and regulating machine tools—including manipulators as defined just now—within the meaning of a numerical controller or a computer-aided numerical controller, which apparatus can also comprise personal computers. The control apparatus can control not only the manipulator by means of its axes in accordance with a trajectory plan determined by the control apparatus by computation, but also further component parts of the manipulator, such as the end effector and, in this case, particularly the operation thereof. Accordingly, the movement of the manipulator by the control apparatus comprises not only the actual movement by the manipulator, but also any movement or activity performed only by the end effector. In addition, the control apparatus can also perform further computer-aided tasks.

The term "machining environment" in the present context comprises not only the production cell with its components but also the workpiece itself and all further objects that are situated in the space that can be reached by the manipulator. Therefore, it is also possible for component parts of the manipulator to be included in the machining environment in this context, and there is thus expressly no exclusion of an overlap for the purposes relevant here.

In line with this definition of terms, the term "environment model" is in turn intended to be understood to mean a data-oriented computation model for at least parts of the machining environment in the above context, which computation model can serve as a basis for model formation within the context of a trajectory plan and for a collision check. This at least partial mapping of the machining environment in the environment model can consist in only the essential elements and not necessarily every detail of the machining environment being mapped in the environment model. In some embodiments, the machining environment can be mapped in the environment model completely.

An essential aspect for the method in accordance with the proposal is now that a trajectory plan is computed by the control apparatus from a setpoint movement by the manipulator starting from an initial situation and based on a kinematic model of the manipulator. Further, a kinematic collision check is performed based on the trajectory plan, the kinematic model and the environment model, and a prediction result is produced based on the kinematic collision check.

The "setpoint movement" by the manipulator is intended to be understood to mean any specification, particularly by the user, of a movement to be carried out by the manipulator. Such a specification can consist of a specific destination or a specific target coordinate for the manipulator and specifically for its Tool Centre Point (TCP) or of the specification of a desired direction of movement by the manipulator or by the Tool Centre Point with or without simultaneous determination of the length or of the duration of the movement or of the desired endpoint. The setpoint movement can also comprise multiple movement sections with respective intermediate positions to be adopted.

In the present case, the term "initial situation" means any mechanical or electrical state property of the manipulator that this manipulator can assume, for example its geometric position, the configuration of the axes, the attitude of each actuator on the manipulator or on the end effector, etc. Instead of "initial situation", it would thus also be possible to use the more detailed wording "initial situation of the manipulator".

Accordingly, the term "kinematic model" denotes a kinematic manipulator model with data that are suitable for electronic mapping of the kinematics of the manipulator and of its initial situation in the above context, particularly for the purpose of a movement computation for the manipulator. The "trajectory plan" in turn is accordingly the future execution, produced by the control apparatus, for example, of the movement for all parts of the manipulator, including the end effector and particularly comprising the axes of the manipulator, that are controllable by the control apparatus.

The term "kinematic collision check" is intended to be understood to mean a computation that provides information about whether and to what extent it is possible, during execution of the trajectory plan by the manipulator, for a collision between the manipulator or one of its constituent parts and a part of the machining environment, insofar as said part is mapped in the environment model, to take place. The result of such a collision check may either be binary, that is to say merely affirm or negate a collision or a particular collision risk, or can provide a percentage probability, or a probability described in another manner, or any other gauge of the occurrence of a collision for the trajectory plan as a whole or for each section of or point on the path of movement in accordance with the trajectory plan. In this case, the collision check can simultaneously also comprise the check for the occurrence of singularities. This kinematic collision check requires not only the movement by the manipulator in accordance with the trajectory plan to be taken into consideration, but also any simultaneous movement by the machining environment or the parts thereof. As such, there may be provision, for example, for the movement by the manipulator to be simultaneously also accompanied by a clamping frame for the workpiece to be machined moving, together with the workpiece. The clamping frame and the workpiece are—as already stated—to be included as part of the machining environment in this context. In such a case, the environment model is also intended to be understood to be variable over time and accordingly non-static.

Finally, the prediction result based on this kinematic collision check provides information about whether or not the setpoint movement by the manipulator is permitted. The prediction result can also contain the statement that the setpoint movement is permitted only under particular circumstances, e.g. with a simultaneous determined movement by the assembly carrier. In other words, the result produced for the possibly complex kinematic collision check is the prediction result.

An essential aspect of the method in accordance with the proposal is now that the initial situation corresponds to the current manipulator state. Thus, the computation of the trajectory plan—and hence also the kinematic collision check based thereon and the production of the prediction result—involves the actual, current manipulator state being used as initial situation. In other words, the initial situation on which the computation of the trajectory plan from the setpoint movement is based corresponds not to a fictitious or projected, past or future situation or to such a state of the manipulator, but rather to the actual situation and the actual state of the manipulator. In this case, the ascertainment of the actual state can fundamentally involve both sensor detection of the manipulator and computation of the actual state of the manipulator in accordance with a known previous state and a known executed movement, or a combination of both approaches.

At any rate, this ensures that the prediction result is based on a collision check that is supported by the current, actual state of the manipulator and a trajectory plan starting from this actual state. Using the prediction result, it is thus possible to assess whether the trajectory plan corresponding to the setpoint movement can be executed by the actual manipulator without a collision risk. This allows a particular movement to be checked for its collision risk and hence for its admissibility "online" and thus at the same time as ongoing operation.

A user who wishes to move the manipulator away from a critical situation at risk of collision as described above can thus simply trust in the prediction result for a proposed setpoint movement in order to learn whether or not this movement and the corresponding trajectory plan could result in a collision. An appraisal of the complex kinematic situation based on one's own intuition, which appraisal is necessarily not 100% reliable, no longer has to be performed. Instead, it is possible to rely on the predictive computation of the method in accordance with the proposal.

As proposed in accordance with various embodiments, the prediction result can be output, so that the user can be made aware thereof. A particularly descriptive output can be achieved by a visualization.

There is particular interest in a real-time output of the prediction result, as proposed by an embodiment. In such a case, the user detects feedback taking place immediately and thus without a loss of time—at any rate felt to be taking place in this way—in response to a change in the setpoint movement or in the manipulator state, which means that he can be informed in real time about whether or not the setpoint movement is possible without a collision. This feedback in real time represents a dramatic improvement in ergonomics. A further embodiment ensures that the prediction result is available before the movement by the manipulator is executed.

Fundamentally, the setpoint movement by the manipulator can be described in arbitrary fashion, for example including by means of data in a computer file. Various embodiments relate to input of the setpoint movement by means of an operator control device, for example by means of a joystick or the like, which is of particular interest ergonomically.

A particularly suitable tool for the collision check consists in the trajectory plan for the manipulator and the environment model being mapped into a virtual state, as proposed by various embodiments. In this way, virtual states of the manipulator that are projected into the future in accordance with the trajectory plan can also be presented to the user in a particularly meaningful way.

An embodiment also provides for repeated provision of the actual initial situation by the control apparatus, so that the kinematic collision check at any time involves the actual manipulator state with an at most negligible time delay.

An embodiment makes use of the opportunity to have a computation apparatus that is separate from the control apparatus execute a computer program that maps the trajectory plan of the control apparatus completely and identically. In this way, it is also possible for the kinematic collision check to be performed independently of but at the same time as the trajectory plan for the control apparatus. Precisely this approach, which conflicts with the conventional way of thinking and which provides for the parallel and hence apparently redundant execution of two identical trajectory plans, facilitates the implementation of a collision prediction in real time.

In order to reliably prevent the occurrence of collisions as far as possible, an embodiment proposes prevention of the actuation of the manipulator when this actuation would, in accordance with the prediction result, result in a collision or in an unacceptable high risk of a collision. This also allows unconscious operator control errors to be prevented.

Finally, an embodiment enables a particularly accurate kinematic model or environment model, namely by virtue of these being supported by model data in electronic form, such as are made available by design programs, for example.

Various embodiments relate to the possibility of performing adaptation of the kinematic model for the trajectory plan in order to compensate for environmental influences such as effects of temperature, for example, that can account for a discrepancy between a setpoint position and an actual position of the manipulator.

Such compensation can also be taken into consideration for the kinematic collision check and for the production of the prediction result.

An embodiments provides a method for motion simulation for a manipulator, such as an NC-controlled manipulator, in a machining environment, wherein the manipulator is moved in an operating mode by a control apparatus and wherein the machining environment is at least partly mapped in an environment model, the method comprising computation of a trajectory plan by the control apparatus from a setpoint movement of the manipulator starting from an initial situation and based on a kinematic model of the manipulator, performance of a kinematic collision check based on the trajectory plan, the kinematic model and the environment model, and production of a prediction result based on the kinematic collision check, wherein the initial situation corresponds to the current manipulator state.

In various embodiments, the method comprises output of the prediction result by an output apparatus, such as a visualization apparatus.

In various embodiments, the performance of the kinematic collision check and the production of the prediction result are effected within a predetermined computation time after a change and/or the setpoint movement, such as wherein a real-time output of the prediction result is provided by the output apparatus, particularly by the visualization apparatus.

In various embodiments, the prediction result is produced before the manipulator is moved by the control apparatus in accordance with the trajectory plan.

In various embodiments, the method comprises acceptance of an input, particularly an input by manual operation, of the setpoint movement by an operator control device.

In various embodiments, the method comprises output of a virtual state based on the trajectory plan and the environment model.

In various embodiments, the output of the virtual state comprises output of a view of a 3D model of the manipulator and of the machining environment, such as wherein the view of the 3D model of the manipulator and the machining environment is based on an adjustable angle of vision.

In various embodiments, the output of the virtual state is effected by the visualization apparatus within a predetermined visualization time after a change and/or input of the setpoint movement, so that a real-time output of the virtual state is provided by the visualization apparatus.

In various embodiments, the initial situation is updated repeatedly, such as within a predetermined update interval, in accordance with the current manipulator state.

In various embodiments, computation of a further trajectory plan is performed by a computation apparatus from the setpoint movement of the manipulator starting from the initial situation and based on the kinematic model of the manipulator, wherein the computation apparatus is connected to the control apparatus by means of a communication network, and wherein the performance of the kinematic collision check and the production of the prediction result are performed in the computation apparatus, such as wherein the computation apparatus reproduces the computation of the trajectory plan by the control apparatus such that the further trajectory plan of the computation apparatus corresponds to the trajectory plan of the control apparatus.

In various embodiments, the control apparatus prevents actuation of the manipulator in accordance with the trajectory plan, particularly on instruction from the computation apparatus, when the prediction result of the trajectory plan indicates a collision risk or a collision result.

In various embodiments, the kinematic model and/or the environment model is based on model data in an electronic form.

In various embodiments, the kinematic model is adapted, such as before the performance of the kinematic collision check, in order to compensate for an environment-dependent discrepancy between the setpoint movement and an actual movement of the manipulator, such as the compensation is based on an actual value measured by a compensating sensor, which actual value is processed with compensation parameters, particularly in that the compensation adapts the model data.

In various embodiments, the discrepancy is based on an actual temperature at the manipulator, and the measured actual value is the actual temperature, such as the compensation parameters comprise temperature coefficients that are used to process the measured actual temperature.

In various embodiments, the compensation is performed by the control apparatus and/or by the computation apparatus, such as the compensation performed by the computation apparatus reproduces the compensation performed by the control apparatus.

In various embodiments, the initial situation is captured by a sensor apparatus, such as the machining environment for the mapping in the environment model is captured by a sensor apparatus.

An embodiment provides for a computer program with program code for performing the following steps for motion simulation for a manipulator when the computer program is executed in a computer: computation of a trajectory plan from a setpoint movement of the manipulator in a machining environment that is at least partly mapped in an environment model, starting from an initial situation and based on a kinematic model of the manipulator, performance of a kinematic collision check based on the trajectory plan, the kinematic model and the environment model, and production of a prediction result based on the kinematic collision check, wherein the initial situation corresponds to the current manipulator state.

An embodiment provides for a system for motion simulation for a manipulator in a machining environment that is at least partly mapped in an environment model, having: a control apparatus that is set up to move the manipulator in an operating mode and is set up to compute a trajectory plan from a setpoint movement of the manipulator starting from an initial situation and based on a kinematic model of the manipulator, and a computation apparatus that is set up to perform a kinematic collision check based on the trajectory plan, the kinematic model and the environment model and to produce a prediction result based on the kinematic collision check, wherein the initial situation corresponds to the current manipulator state.

BRIEF DESCRIPTION OF THE DRAWINGS

Various embodiments are explained in more detail below on the basis of a drawing that depicts merely exemplary embodiments, in which drawing

DETAILED DESCRIPTION

Figure 1:
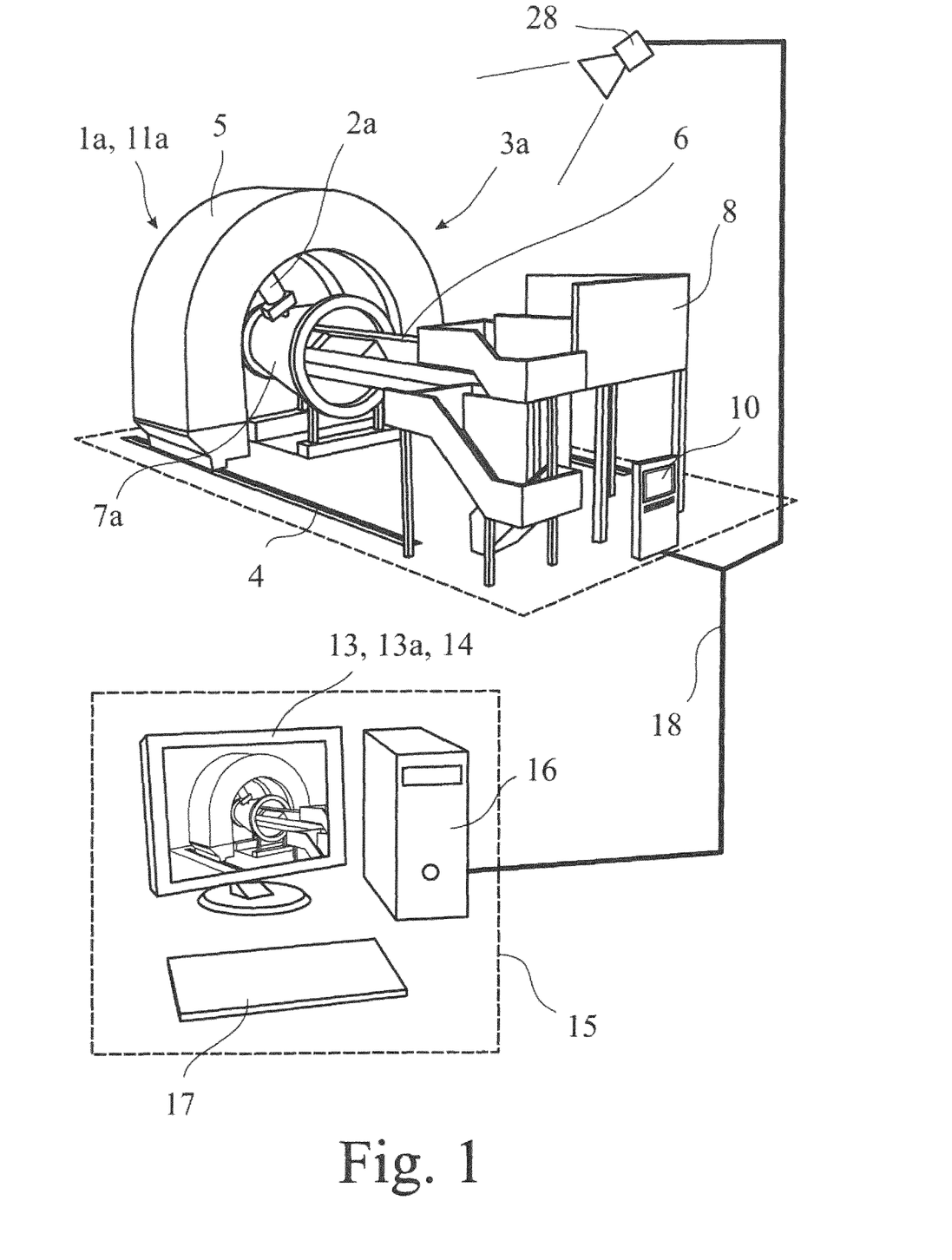
FIG. 1 shows an overall view of an arrangement of a production cell with associated components in accordance with a first exemplary embodiment, which arrangement is set up to carry out the method in accordance with the proposal.

The exemplary embodiments described in the present disclosure relate to a manipulator 1a,b in a production cell, in which production cell rivet joints are put onto aircraft structure assemblies by a riveting machine. The manipulator 1a,b is NC-controlled. The production cell of the first exemplary embodiment, reproduced in FIG. 1, is an integrated section assembly cell for machining 360°-fuselage sections.

The riveting machine forms the end effector 2a of the manipulator 1a, which is a 12-axis positioner in the present case. The production cell of both exemplary embodiments with all their associated component parts forms a respective machining environment 3a,b in the context of the definition of terms above.

The end effector 2a can be moved on the inner surface of a production arch 5 displaceable along base rails 4, the the base rails 4 and the production arch 5 therefore each forming both a part of the machining environment 3a and a part of the manipulator 1a. A moveable assembly carrier 6 has the workpiece 7a mounted on it, said workpiece being an aircraft structure assembly in the present case. In addition, an access framework 8 for personnel is provided in the production cell. In line with the definition of terms already set out, the assembly carrier 6, the workpiece 7a and the access framework 8 likewise belong to the machining environment 3a. Further, a control apparatus 10 belongs to the production cell.

Figure 3:
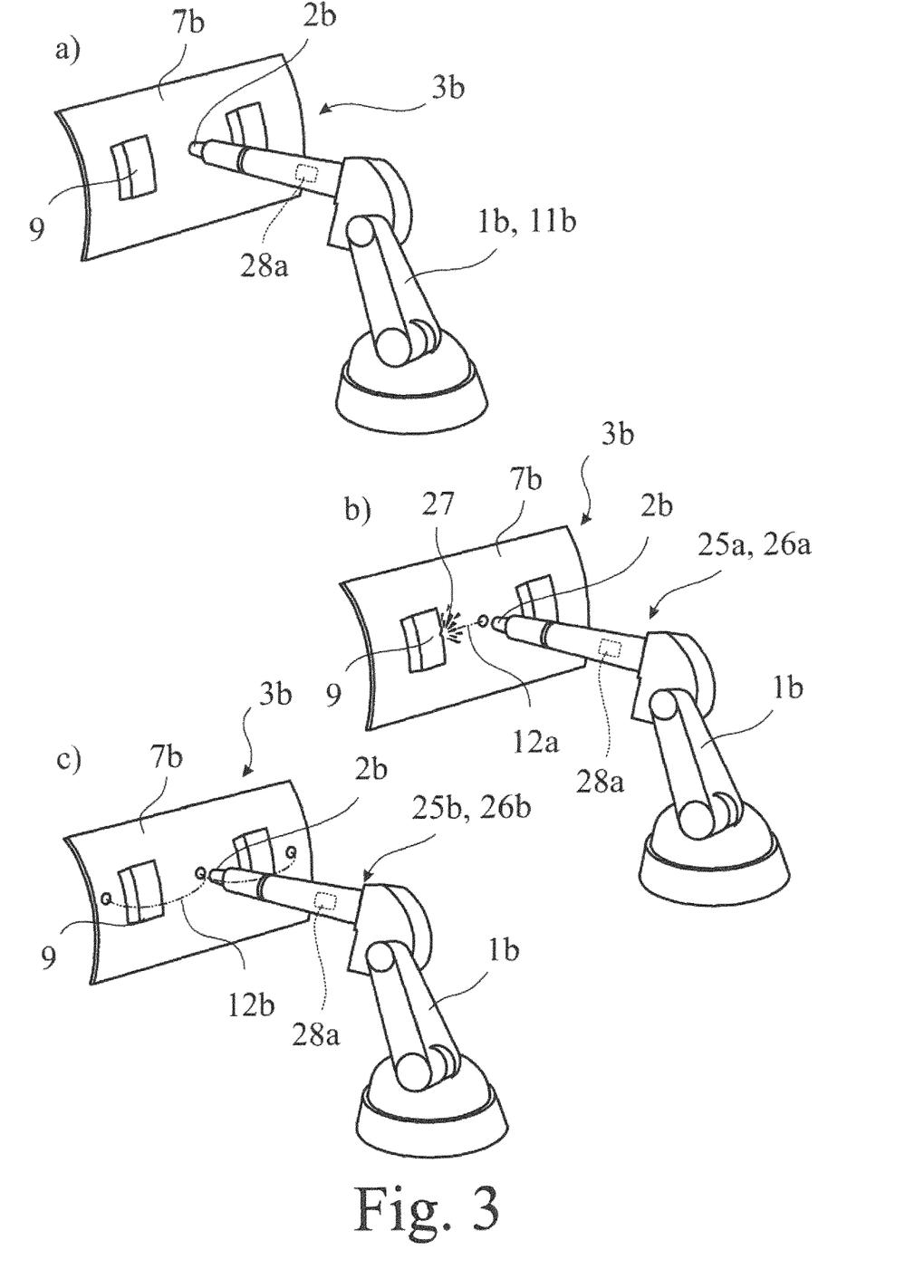

FIG. 3a-c, to which reference is likewise made below, reproduce a second, simplified exemplary embodiment with a six-axis manipulator 1b with end effector 2b, the machining environment 3b of which comprises a workpiece 7b with two projections 9. The initial state of the second exemplary embodiment is reproduced in FIG. 3a in this case.

The method in accordance with the proposal is used, as already stated, for motion simulation for a manipulator 1a,b in a machining environment 3a,b. The method in accordance with the proposal involves the manipulator 1a,b being moved in an operating mode by a control apparatus 10 (not depicted for the exemplary embodiment of FIG. 3a-c), the machining environment 3a,b being mapped at least partly in an environment model. Here and below, "operating mode" is understood to mean a mode of operation for the machining of workpieces by the manipulator in accordance with requirements. A calibration or test mode is not covered thereby.

The method in accordance with the proposal comprises the computation of a trajectory plan 12a,b by the control apparatus 10 from a setpoint movement by the manipulator 1a,b starting from an initial situation 11a,b of the manipulator 1a,b and based on a kinematic model of the manipulator model 1a,b. For the purpose of clarity, such trajectory plans 12a,b are depicted only for the second exemplary embodiment. FIGS. 3b and 3c relate to a respective trajectory plan 12a,b, both of which start from the initial situation 11b of the manipulator 1b in accordance with FIG. 3a.

Further, the method in accordance with the proposal comprises the performance of a kinematic collision check based on the trajectory plan 12a,b, the kinematic model and the environment model and the production of a prediction result based on the kinematic collision check.

The method in accordance with the proposal is characterized in that the initial situation 11a,b corresponds to the current manipulator state. In this way, the prediction result produced provides a statement about whether and to what extent actual execution of a movement by the manipulator 1a,b along the trajectory plan 12a,b ascertained by the the control apparatus 10 represents a collision risk.

The method can comprise output of the prediction result by an output apparatus 13, and as in the present case, a visualization apparatus 13a,b. In the exemplary embodiment of FIG. 1, such a visualization apparatus 13a is formed by the screen 14 of a computer arrangement 15 having a computation apparatus 16 and an operator control device 17 in the form of a keyboard. The computer arrangement 15 as a whole and specifically the computation apparatus 16 are connected to the control apparatus 10 by means of a communication network 18.

Figure 2:
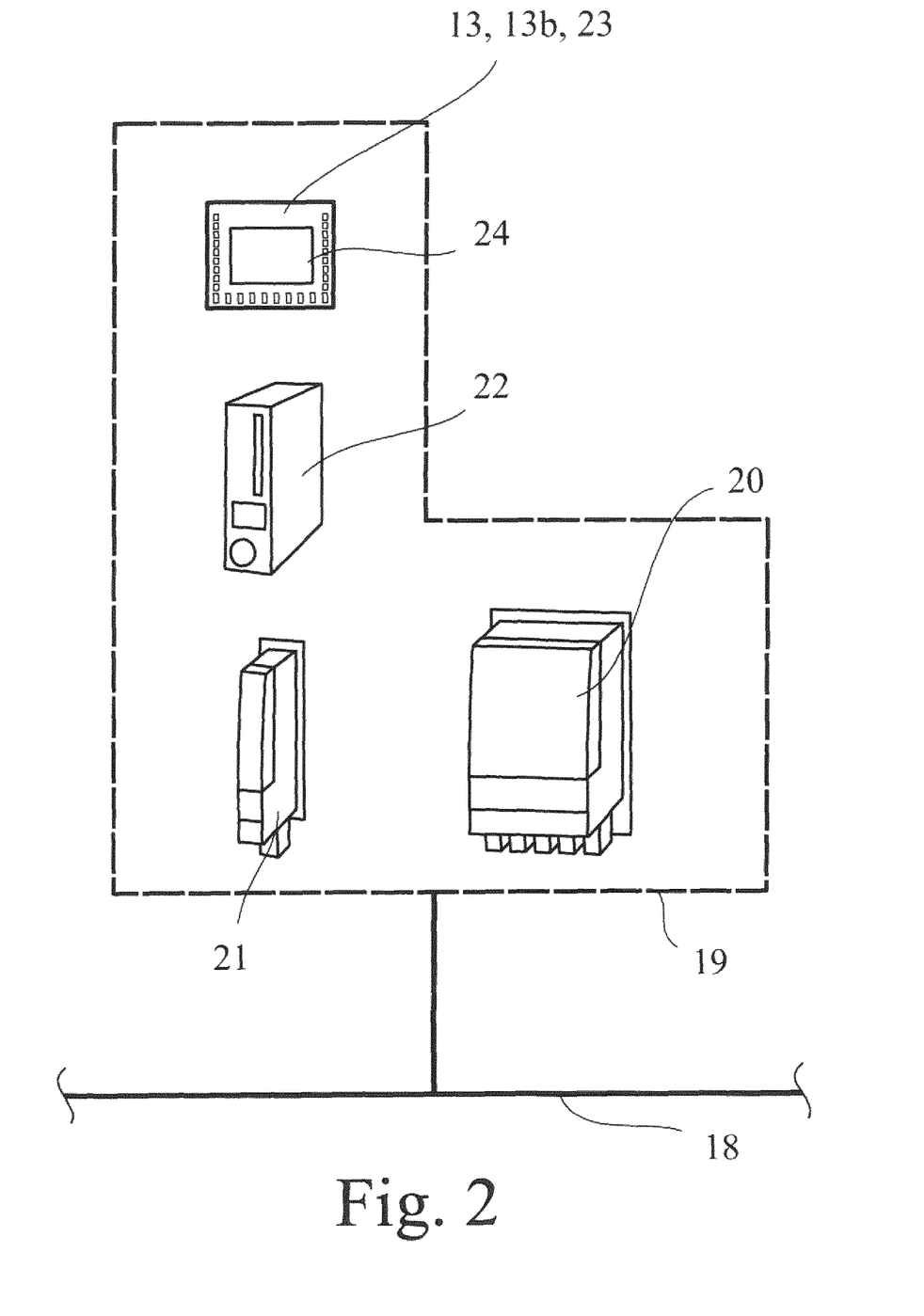
FIG. 2 shows a schematic depiction of components parts of the control apparatus from the arrangement in FIG. 1, FIG. 3a-c show a manipulator in accordance with a second exemplary embodiment and depictions of this manipulator by a visualization apparatus in conjunction with the method in accordance with the proposal.

In the present case and as depicted more precisely in FIG. 2, the control apparatus 10 is the modular system SINUMERIK® 840D sl 19, which comprises a SINAMICS® S120 as drive system 20 and an NCU 720.3ON as numerical control unit 21 and a PCU 50.5-P as computer unit 22. A SINUMERIK® Operator Panel OP 019 23 can likewise form a visualization apparatus 13b for outputting the prediction result. The SINUMERIK® Operator Panel OP 019 23 can further have a user interface 24 in the form of a keypad.

To shorten the iteration periods and for the most convenient operator control possible, the user needs to be provided with feedback about his input—that is to say the setpoint movement he requests—that is perceived to be more or less immediate. This can be achieved by virtue of the performance of the kinematic collision check and the production of the prediction result taking place within a predetermined computation time after a change and/or input of the setpoint movement. In particular, real-time output of the prediction result is intended to be provided by the output apparatus 13, in the present case specifically by the visualization apparatus 13a,b. The term "real-time output" is intended to be understood in a first, general, sense as outlined above, that is to say that the maximum computation time is prescribed within which the prediction result is provided by the output apparatus 13 or the visualization apparatus 13a,b. The user subjectively perceives an output in response to an input as taking place in real time when the output takes place within 50 milliseconds after the input. This felt reaction in real time is particularly clear when the output even takes place within 10 milliseconds after the input. Consequently, it can be that the output of the prediction result by the output apparatus 13 or by the visualization apparatus 13a,b to take place within 50 milliseconds and particularly within 10 milliseconds after a change and/or input of the setpoint movement.

The prediction result itself can actually be used by the control apparatus 10 as a clearance signal for moving actuation of the manipulator 1a,b. Accordingly, such actuation takes place, in some embodiments, only when the prediction result for an actuation in accordance with the trajectory plan predicts no collision. In other words, the prediction result can be produced before the manipulator 1a,b is moved by the control apparatus 10 in accordance with the trajectory plan 12a,b.

A real-time output of this kind is particularly useful when the corresponding input of the setpoint movement is also effected not by the reading of a file or a similar process but rather by manual action by the user. In some embodiments, the method can comprise acceptance of an input—and in this case particularly an input by manual operation—of the setpoint movement by an operator control device 17. In the present example, the operator control device 17 is the cited keyboard of the computer arrangement 19, but another possibility is the user interface 24 of the SINUMERIK® Operator Panel OP 019 23 or a joystick—not shown here— of the computer arrangement 15 or of the control apparatus 10.

A very vivid description is an output that graphically depicts the future state of the manipulator 1a,b in the machining environment 3a, 3b. It is therefore possible for the method in accordance with the proposal to comprise output of a virtual state 25a,b based on the trajectory plan 12a,b and the environment model. The term virtual state 25a,b is intended to be understood to mean the electronic mapping firstly of the manipulator 1a,b based on the kinematic model after execution of the trajectory plan 12a,b starting from the initial situation 11a,b and secondly of the machining environment 3a,b based on the environment model, likewise after execution of the movement by the manipulator 1a,b. In other words, the virtual state 25a,b denotes a comprehensive computational model of the manipulator 1*a,b* and of the machining environment 3*a,b* after a movement by the manipulator 1*a,b* along the trajectory plan 12*a,b*. The virtual state 25*a,b* can in this case also take into consideration any movement by the machining environment 3*a,b* as a whole or by individual parts thereof that takes place in the relevant time. Such a movement could, for example in the exemplary embodiment of FIG. 1, consist of a rotation by the assembly carrier 6 with the workpiece 7*a*.

This configuration can be developed further by virtue of the output of the virtual state 25*a,b* comprising the output of a view 26*a,b* of a 3D model of the manipulator 1*a,b* and of the machining environment 3*a,b*. This 3D model is a representation, suitable for depiction, of the virtual state 25*a,b* and thus of the state of the manipulator 1*a,b* and of the machining environment 3*a,b* after movement in accordance with the trajectory plan 12*a,b* has taken place. The view 26*a,b* is in turn the two-dimensional depiction that arises from this 3D model and the angle of vision of an—imaginary—observer and that is therefore suitable for reproduction on a conventional visualization apparatus 13*a,b*.

FIGS. 3*b* and 3*c* each reproduce such a view 26*a,b* by way of example, which would conceivably also be able to be reproduced on the screen 14 of the computer arrangement 15 of FIG. 1, for example, no graphical distinction being drawn in FIGS. 3*b* and 3*c* between the view 26*a,b* and the virtual state 25*a,b* on which the view is based, for the sake of simplicity of the depiction.

In some embodiments, the angle of vision on which the depiction is based is adjustable, which means that the view 26*a,b* of the 3D model of the manipulator 1*a,b* and of the machining environment 3*a,b* is based on an adjustable angle of vision. This means that the user can choose a perspective for the view 26*a,b* that is particularly suitable for capturing the present collision situation.

The output of the virtual state 25*a,b* may also be designed such that a graphically particularly easily identifiable fashion is used to denote whether the prediction result indicates a collision situation or a collision risk or whether it indicates the absence of such a collision situation or such a collision risk. As such, the view 26*a* in FIG. 3*b*, for example, shows a virtual state 25*a* for which—in accordance with the prediction result—the trajectory plan 12*a* has resulted in a projected collision between the manipulator 1*b* and a projection 9 of the workpiece 7*b*, which is made clear to the user from the view 26*a* by the collision pictogram 27. The user is thus clearly warned that this trajectory plan 12*a* should not be executed. As an alternative or in addition to the collision pictogram 27, the view 26*a* could also be coloured in a warning colour—e.g. in red—for warning purposes.

Conversely, the view 26*b* in FIG. 3*c* likewise clearly reveals that a movement in accordance with the trajectory plan 12*b* can be executed without a collision risk. In the present case, this is accomplished by a depiction of the trajectory plan 12*b* without a collision pictogram, there additionally being able to be provision for a reproduction of the view 26*a* in a clearance colour—for example in green—in this case too.

A real-time output in the sense already defined above is advantageous to the user for the output of the virtual state 25*a,b* too. Consequently, it is possible for the output of the virtual state 25*a,b* by the visualization apparatus 13*a,b* to be effected within a predetermined visualization time after a change and/or input of the setpoint movement, so that a real-time output of the virtual state 25*a,b* is provided by the visualization apparatus 13*a,b*. The real-time output is, as already noted, particularly perceived as "in real time" when the predetermined visualization time is 50 milliseconds or even 10 milliseconds. In the case of the output of the view 26*a,b* of the 3D model of the manipulator 1*a,b* as just described, this accordingly applies in the same way to this output of the view 26*a,b*.

The impression of as prompt a prediction as possible for the movement of the manipulator 1*a,b* is achieved not only by a real-time output as described above in response to the input or change of the setpoint movement but also by virtue of a changing situation of the manipulator 1*a,b* during the movement by the manipulator 1*a,b* being continually taken into consideration and displayed. Accordingly, it is advantageous for the initial situation 11*a,b* to be updated repeatedly and within a predetermined update interval in accordance with the current manipulator state. This results in both the kinematic collision check and the production of the prediction result being based on the actual situation of the manipulator 1*a,b* promptly. In some embodiments, the initial situation 11*a,b* updated within the predetermined update interval is also taken as a basis for the virtual state 25*a,b* and likewise for the view 26*a,b*, so that these are also always able to be output to the user in promptly updated fashion. It further makes sense in this case for the environment model accordingly also to be updated within the predetermined update interval.

The possibility of external simulation of the trajectory plan 12*a,b* by the control apparatus 10 can be used beneficially by virtue of, in accordance with various embodiments, computation of a further trajectory plan being performed by a computation apparatus 16 from the setpoint movement of the manipulator 1*a,b* starting from an initial situation 11*a,b* and based on the kinematic model of the manipulator 1*a,b*, wherein the computation apparatus 16 is connected to the control apparatus 10 by means of a communication network 18, and wherein the performance of the kinematic collision check and the production of the prediction result are performed in the computation apparatus 16.

Accordingly, the setpoint movement is thus either input directly on the computation apparatus 16—for example by means of the operator control device 17—or input on the control apparatus 10 and transmitted via the communication network 18 to the computation apparatus 16, which maps the setpoint movement by the manipulator 1*a,b* into the further trajectory plan and hence simulates the trajectory plan 12*a,b* of the control apparatus 10 in the sense of replication or reproduction. This is possible particularly because the applicable functionality of the control apparatus 10—including the processing of the environment model and of the kinematic model—can be reproduced completely as software code on the computation apparatus 16. Accordingly, the kinematic collision check and the production of the prediction result are either performed in the computation apparatus 16 in addition to the respective process on the control apparatus 10 or take place exclusively on the computation apparatus 16.

To avoid double data pools, the kinematic model and the environment model can also be transmitted from the control apparatus 10 to the computation apparatus 16 via the communication network 18.

Particular advantages arise when the computation apparatus 16 reproduces the computation of the trajectory plan 12*a,b* of the control apparatus 10 such that the further trajectory plan of the computation apparatus 16 corresponds to the trajectory plan 12*a,b* of the control apparatus 10. Thus, the computation function is replicated such that the kinematic collision check and the production of the prediction result do not require the trajectory plan 12*a,b* of the control apparatus 10 to be resorted to, but rather the further trajectory plan of the computation apparatus 16 can be used immediately. Furthermore, these processes in the computation apparatus 16 can be performed independently and potentially also more quickly than by the control apparatus 10, which facilitates the implementation of a real-time output in accordance with the embodiments already described.

A particularly suitable interface between the control apparatus 10 and the computation apparatus 16 can be provided by virtue of the communication network 18 chosen being an Ethernet connection on which TCP/IP (Transmission Control Protocol/Internet Protocol) is used as the protocol stack or part of the protocol stack. On the basis of this, for the data interchange between the computation apparatus 16 and the control apparatus 10, it is possible to use appropriate program libraries such as COM (Component Object Model), DCOM (Distributed Component Object Model), RPC (Remote Procedure Call), OCX (Object Linking and Embedding Control eXtension) or further developments thereof.

Actual prevention of user actions that could otherwise result in a collision can be achieved by virtue of the control apparatus 10 preventing actuation of the manipulator 1*a,b* in accordance with the trajectory plan 12*a,b* when the prediction result outputs a collision risk or a collision result. This prevention of the actuation of the manipulator 1*a,b* by the control apparatus 10 can be effected particularly on the instruction of the computation apparatus 16. By way of example, there could be provision for such prevention in the case of such a prediction result as depicted in FIG. 3*b*. A corresponding action by the user to prompt such actuation would thus be actively blocked by the control apparatus 10. In the case depicted in FIG. 3*c*, on the other hand, such blocking would not take place.

Production of the kinematic model and the environment model is simplified when the kinematic model and/or the environment model is based on model data in electronic form. These may also be model data. These can come from applicable computer programs such as CATIA®, for example, or from the files produced by these computer programs.

The kinematic model can be adapted in order to compensate for an environment-dependent discrepancy between the setpoint movement and an actual movement by the manipulator 1*a,b*. As such, temperature changes on the manipulator, for example, can result in expansion of particular parts of the manipulator. Actuation of the manipulator 1*a,b* in accordance with the trajectory plan 12*a,b* then results in an actual movement that differs from that in accordance with the trajectory plan 12*a,b*. If the relationship between temperature and such expansions is known, however, then it is possible to take into consideration and hence compensate for such a discrepancy. Besides the temperature, forces acting on the manipulator, such as e.g. process forces, can also account for a discrepancy in the above context.

In some embodiments, this adaptation takes place before the kinematic collision check is performed. In this respect, it is then taken into consideration both for the performance of the kinematic collision check and the production of the prediction result. The adaptation can also take place even before the computation of the trajectory plan 12*a,b* and can then be taken into consideration for the computation of the trajectory plan 12*a,b*.

It is further possible for the compensation to be based on an actual value measured by a compensating sensor 28*a*, which actual value is processed using in particular stored compensation parameters. This compensating sensor 28*a* may—in accordance with the depiction in FIG. 3*a-c*—be a temperature sensor. The processing with compensation parameters can particularly comprise multiplication by compensation coefficients. The result of the processing can then be applied to the kinematic model. It is also conceivable for the compensation to adapt the model data on which the kinematic model can be based. The compensation parameters may be based on a calibration process that has been performed in a calibration mode before the operating mode.

In accordance with the exemplary embodiment of FIG. 3*a-c*, there can be provision for the discrepancy to be based on an actual temperature at the manipulator 1*a,b*—such as measured by the compensating sensor 28—and for the measured actual value to be the actual temperature. Thus, temperature compensation is involved.

Accordingly, it is possible for the compensation parameters to comprise temperature coefficients that are used to process the measured actual temperature.

It is further possible for the compensation to be performed by the control apparatus 10 and/or by the computation apparatus 16. It is thus also possible for the computation apparatus 16 to receive—indirectly or directly—the actual value for processing. In this case, it is possible for the compensation performed by the computation apparatus 16 to reproduce the compensation performed by the control apparatus 10.

The initial situation 11*a,b* of the manipulator 1*a,b* can either be determined by a known previous situation of the manipulator 1*a,b* and known subsequent movements or detected by a sensor apparatus 28. Equally, it is also possible for the machining environment 3*a,b* to be detected by a sensor apparatus 28 for the purpose of mapping in the environment model. Such a sensor apparatus 28 can comprise a multiplicity of separate sensors that also operate on the basis of respectively different physical principles and, if need be, communicate with one another and with the control apparatus 10 and the computation apparatus 16 by message interchange, for example via the communication network 18.

The computer program in accordance with the proposal has program code for performing the following steps for motion simulation for a manipulator 1*a,b* when the computer program is executed in a computer: computation of a trajectory plan 12*a,b* from a setpoint movement of the manipulator 1*a,b* in a machining environment 3*a,b* that is at least partly mapped in an environment model, starting from an initial situation 11*a,b* and based on a kinematic model of the manipulator 1*a,b*, performance of a kinematic collision check based on the trajectory plan 12*a,b*, the kinematic model and the environment model, and production of a prediction result based on the kinematic collision check. The computer program in accordance with the proposal is characterized in that the initial situation 11*a,b* corresponds to the current manipulator state.

The proposal also relates to a corresponding computer program product that can be loaded directly into the internal memory of a digital computer and comprises software code sections that are used to carry out the following steps when the product runs on a computer: computation of a trajectory plan 12*a,b* from a setpoint movement of the manipulator 1*a,b* in a machining environment 3*a,b* that is at least partly mapped in an environment model, starting from an initial situation 11*a,b* and based on a kinematic model of the manipulator 1*a,b*, performance of a kinematic collision check based on the trajectory plan 12*a,b*, the kinematic model and the environment model, and production of a prediction result based on the kinematic collision check.

This computer program product in accordance with the proposal is characterized in that the initial situation 11a,b corresponds to the current manipulator state.

The system in accordance with the proposal for motion simulation for a manipulator 1a,b in a machining environment 3a,b that is mapped in an environment model has a control apparatus 10 that is set up to move the manipulator 1a,b in an operating mode and is set up to compute a trajectory plan 12a,b from a setpoint movement by the manipulator 1a,b starting from an initial situation 11a,b and based on a kinematic model of the manipulator 1a,b and has a computation apparatus 16 that is set up to perform a kinematic collision check based on the trajectory plan 12a,b, the kinematic model and the environment model and to produce a prediction result based on the kinematic collision check. The system in accordance with the proposal is characterized in that the initial situation 11a,b corresponds to the current manipulator state.

Various configurations of the computer program in accordance with the proposal and the system for motion simulation in accordance with the proposal are respectively obtained from the various configurations of the method in accordance with the proposal.

Figure 4:
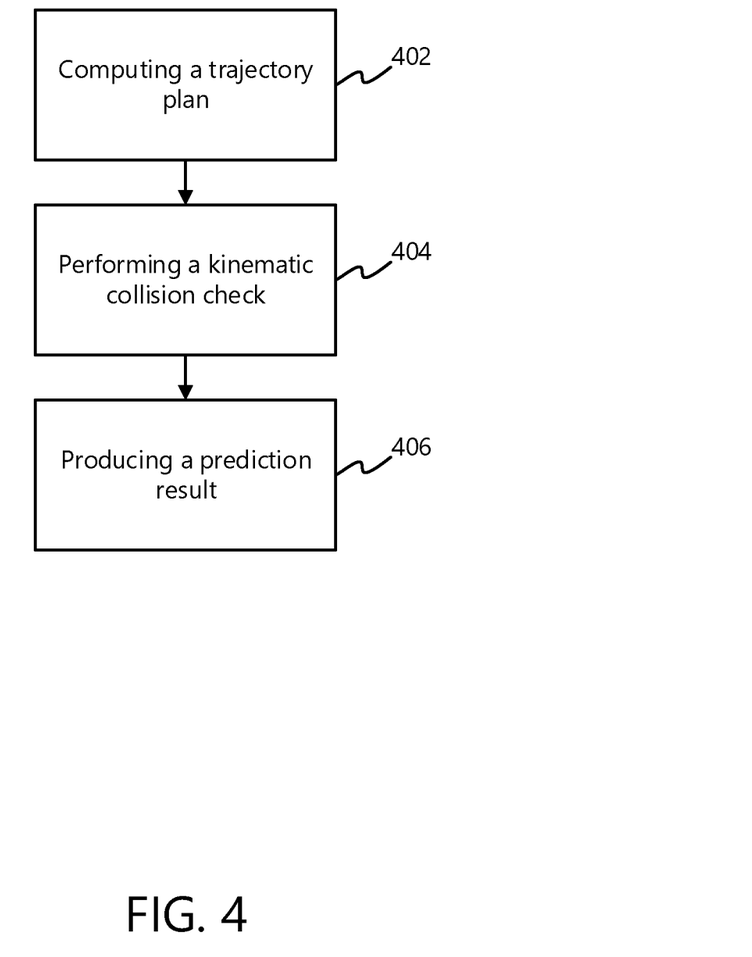
FIG. 4 shows a flow chart depiction of a method for motion simulation for a manipulator in a machining environment in accordance with the proposal.

A method for motion simulation for a manipulator in a machining environment is shown in FIG. 4. The manipulator is moved in an operating mode by a control apparatus and the machining environment is at least partly mapped in an environment mode. The method can include computing a trajectory plan 402 by the control apparatus from a setpoint movement of the manipulator starting from an initial situation and based on a kinematic model of the manipulator. The method can include performing a kinematic collision check 404 based on the trajectory plan, the kinematic model, and the environment model. The method can further include producing a prediction result 406 based on the kinematic collision check. In various embodiments, the initial situation corresponds to a current manipulator state.

The invention claimed is:

1. A method for motion simulation for a manipulator in a machining environment, wherein the manipulator is moved in an operating mode by a control apparatus and wherein the machining environment is at least partly mapped in an environment model, the method comprising:
    computing a trajectory plan by the control apparatus from a setpoint movement of the manipulator starting from an initial situation and based on a kinematic model of the manipulator;
    performing a kinematic collision check based on the trajectory plan, the kinematic model, and the environment model;
    producing a prediction result based on the kinematic collision check;
    accepting an input of the setpoint movement by an operator control device;
    wherein the initial situation corresponds to a current manipulator state;
    wherein the kinematic model and/or the environment model is based on model data in an electronic form.

2. The method for motion simulation according to claim 1, wherein the method comprises output of the prediction result by an output apparatus.

3. The method for motion simulation according to claim 2, wherein the performing of the kinematic collision check and the producing of the prediction result are effected within a predetermined computation time after a change and/or the setpoint movement.

4. The method for motion simulation according to claim 3, wherein the producing of the prediction result occurs before the manipulator is moved by the control apparatus in accordance with the trajectory plan.

5. The method for motion simulation according to claim 1, wherein the method comprises output of a virtual state based on the trajectory plan and the environment model.

6. The method for motion simulation according to claim 5, wherein the output of the virtual state comprises output of a view of a 3D model of the manipulator and of the machining environment.

7. The method for motion simulation according to claim 5, wherein the output apparatus comprises a visualization apparatus,
    wherein the output of the virtual state is effected by the visualization apparatus within a predetermined visualization time after a change and/or input of the setpoint movement, so that a real-time output of the virtual state is provided by the visualization apparatus.

8. The method for motion simulation according to claim 1, wherein the initial situation is updated repeatedly in accordance with the current manipulator state.

9. The method for motion simulation according to claim 1, wherein computation of a further trajectory plan is performed by a computation apparatus from the setpoint movement of the manipulator starting from the initial situation and based on the kinematic model of the manipulator, wherein the computation apparatus is connected to the control apparatus by a communication network, and wherein the performance of the kinematic collision check and the production of the prediction result are performed in the computation apparatus.

10. The method for motion simulation according to claim 1, wherein the kinematic model is adapted to compensate for an environment-dependent discrepancy between the setpoint movement and an actual movement of the manipulator, wherein compensation is based on an actual value measured by a compensating sensor, and wherein the actual value is processed with compensation parameters.

11. The method for motion simulation according to claim 10, wherein the discrepancy is based on an actual temperature at the manipulator, and the measured actual value is the actual temperature.

12. The method for motion simulation according to claim 10, wherein the compensation is performed by the control apparatus and/or by the computation apparatus.

13. The method for motion simulation according to claim 1, wherein the initial situation is captured by a sensor apparatus.

14. The method for motion simulation according to claim 3, wherein a real-time output of the prediction result is provided by the output apparatus.

15. The method for motion simulation according to claim 6, wherein the view of the 3D model of the manipulator and the machining environment is based on an adjustable angle of vision.

16. The method for motion simulation according to claim 9, wherein the computation apparatus reproduces the computation of the trajectory plan by the control apparatus such that the further trajectory plan of the computation apparatus corresponds to the trajectory plan of the control apparatus.

17. A method for motion simulation for a manipulator in a machining environment, wherein the manipulator is moved in an operating mode by a control apparatus and wherein the machining environment is at least partly mapped in an environment model, the method comprising:

computing a trajectory plan by the control apparatus from a setpoint movement of the manipulator starting from an initial situation and based on a kinematic model of the manipulator;

performing a kinematic collision check based on the trajectory plan, the kinematic model, and the environment model;

producing a prediction result based on the kinematic collision check;

accepting an input of the setpoint movement by an operator control device; and preventing actuation of the manipulator in accordance with the trajectory plan when the prediction result of the trajectory plan indicates a collision risk or a collision result;

wherein the initial situation corresponds to a current manipulator state.

18. A method for motion simulation for a manipulator in a machining environment, wherein the manipulator is moved in an operating mode by a control apparatus and wherein the machining environment is at least partly mapped in an environment model, the method comprising:

computing a trajectory plan by the control apparatus from a setpoint movement of the manipulator starting from an initial situation and based on a kinematic model of the manipulator;

performing a kinematic collision check based on the trajectory plan, the kinematic model, and the environment model;

producing a prediction result based on the kinematic collision check; and outputting a virtual state based on the trajectory plan and the environment model with an output apparatus, wherein the output apparatus comprises a visualization apparatus, wherein the output of the virtual state is effected by the visualization apparatus within a predetermined visualization time after a change and/or input of the setpoint movement, so that a real-time output of the virtual state is provided by the visualization apparatus;

wherein the initial situation corresponds to a current manipulator state;

wherein the kinematic model and/or the environment model is based on model data in an electronic form.

19. A system for motion simulation for a manipulator in a machining environment that is at least partly mapped in an environment model, the system comprising:

a control apparatus that is set up to move the manipulator in an operating mode and is set up to compute a trajectory plan from a setpoint movement of the manipulator starting from an initial situation and based on a kinematic model of the manipulator;

an operator control device configured for an operator to input the setpoint movement; and a computation apparatus that is set up to perform a kinematic collision check based on the trajectory plan, the kinematic model and the environment model and to produce a prediction result based on the kinematic collision check;

wherein the initial situation corresponds to a current manipulator state.

* * * * *